United States Patent
Popov et al.

(10) Patent No.: US 11,430,468 B1
(45) Date of Patent: Aug. 30, 2022

(54) DATA STORAGE DEVICE ADAPTING READ ELEMENT USAGE

(71) Applicant: Western Digital Technologies, Inc., San Jose, CA (US)

(72) Inventors: Zarko Popov, Mission Viejo, CA (US); Hitoshi Yoshida, Kanagawa (JP); Arundhathi R. Kanchrakuntla, Placentia, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/326,868

(22) Filed: May 21, 2021

(51) Int. Cl.
    *G11B 5/54* (2006.01)
    *G11B 5/012* (2006.01)

(52) U.S. Cl.
    CPC .................... *G11B 5/012* (2013.01)

(58) Field of Classification Search
    CPC ... G11B 27/36; G11B 20/10037; G11B 20/18; G11B 5/012; G11B 2220/20; G11B 2220/90; G11B 5/00; G11B 5/02; G11B 5/54; G11B 5/59633; G11B 5/59638; G11B 15/02; G11B 19/02
    USPC ...................................................... 360/75, 64
    See application file for complete search history.

(56) References Cited

U.S. PATENT DOCUMENTS

| | | | |
|---|---|---|---|
| 7,054,093 B1 | 5/2006 | Anderson et al. | |
| 7,193,812 B2 | 3/2007 | Eaton | |
| 7,480,117 B2 | 1/2009 | Biskeborn et al. | |
| 7,724,459 B2 | 5/2010 | Czarnecki et al. | |
| 8,982,495 B2 | 3/2015 | Biskeborn et al. | |
| 9,208,809 B2 | 12/2015 | Biskeborn et al. | |
| 9,251,856 B1 | 2/2016 | Wheelock et al. | |
| 9,607,632 B1 * | 3/2017 | Matousek | G11B 20/10027 |
| 9,613,642 B1 | 4/2017 | Erden et al. | |
| 9,990,941 B1 | 6/2018 | Sapozhnikov et al. | |
| 10,453,480 B1 | 10/2019 | Sapozhnikov et al. | |
| 2003/0028841 A1 * | 2/2003 | Rushton | G11B 7/00458 |

* cited by examiner

*Primary Examiner* — Nabil Z Hindi
(74) *Attorney, Agent, or Firm* — Patterson + Sheridan, LLP; Steven H. VerSteeg

(57) ABSTRACT

A data storage device is disclosed comprising a head actuated over a disk comprising a plurality of data tracks, wherein each data track comprises a plurality of data sectors and the head comprises a first read element and a second read element. When a first read command is received from a host to read a plurality of data sectors from the disk, the first read element is used to read a first data sector of the first read command, and when the first read element fails to recover the first data sector of the first read command, the second read element is used to read a second data sector of the first read command.

20 Claims, 3 Drawing Sheets

DATA STORAGE DEVICE ADAPTING READ ELEMENT USAGE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
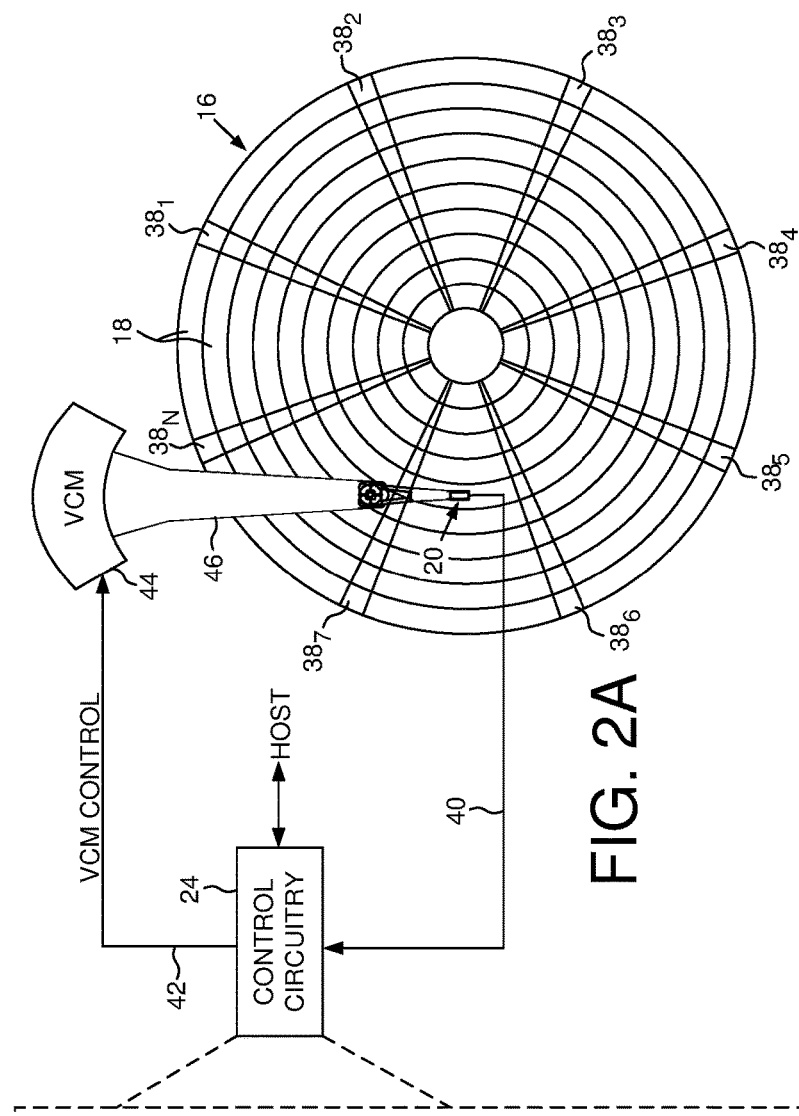
FIG. 2A shows a data storage device in the form of a disk drive according to an embodiment comprising a head actuated over a disk, wherein the head comprises a first read element and a second read element.
Figure 2B:
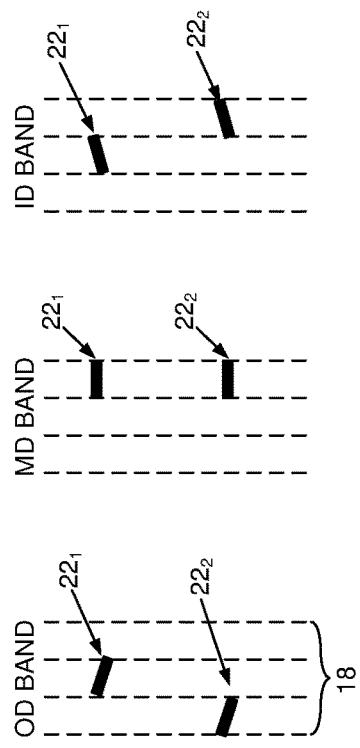
FIG. 2B shows an embodiment wherein the first read element may be offset by at least one data track from the second read element depending on a skew angle of the head.
Figure 2C:
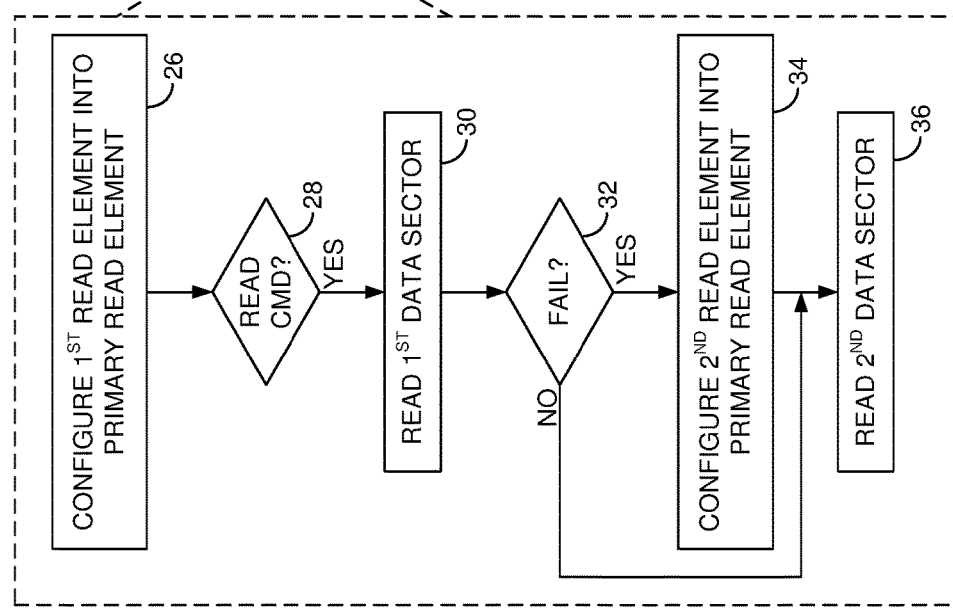
FIG. 2C is a flow diagram according to an embodiment wherein when the first read element fails to recover data during a read command, the second read element is used for the read command.

FIG. 2A shows a data storage device in the form of a disk drive according to an embodiment comprising a disk 16 comprising a plurality of data tracks 18 each comprising a plurality of data sectors. A head 20 is actuated over the disk 16, wherein the head 20 comprises a first read element $22_1$ and a second read element $22_2$ (FIG. 2C). The disk drive further comprises control circuitry 24 configured to execute the flow diagram of FIG. 2C, wherein the first read element is configured into a primary read element and the second read element is configured into a secondary read element (block 26). When a first read command is received from a host to read a plurality of data sectors from the disk (block 28), the primary read element is used to read a first data sector of the first read command (block 30). When the primary read element fails to recover the first data sector of the first read command (block 32), the second read element is configured into the primary read element and the first read element is configured into the secondary read element (block 34). The primary read element is used to read a second data sector of the first read command (block 36).

Figure 1:
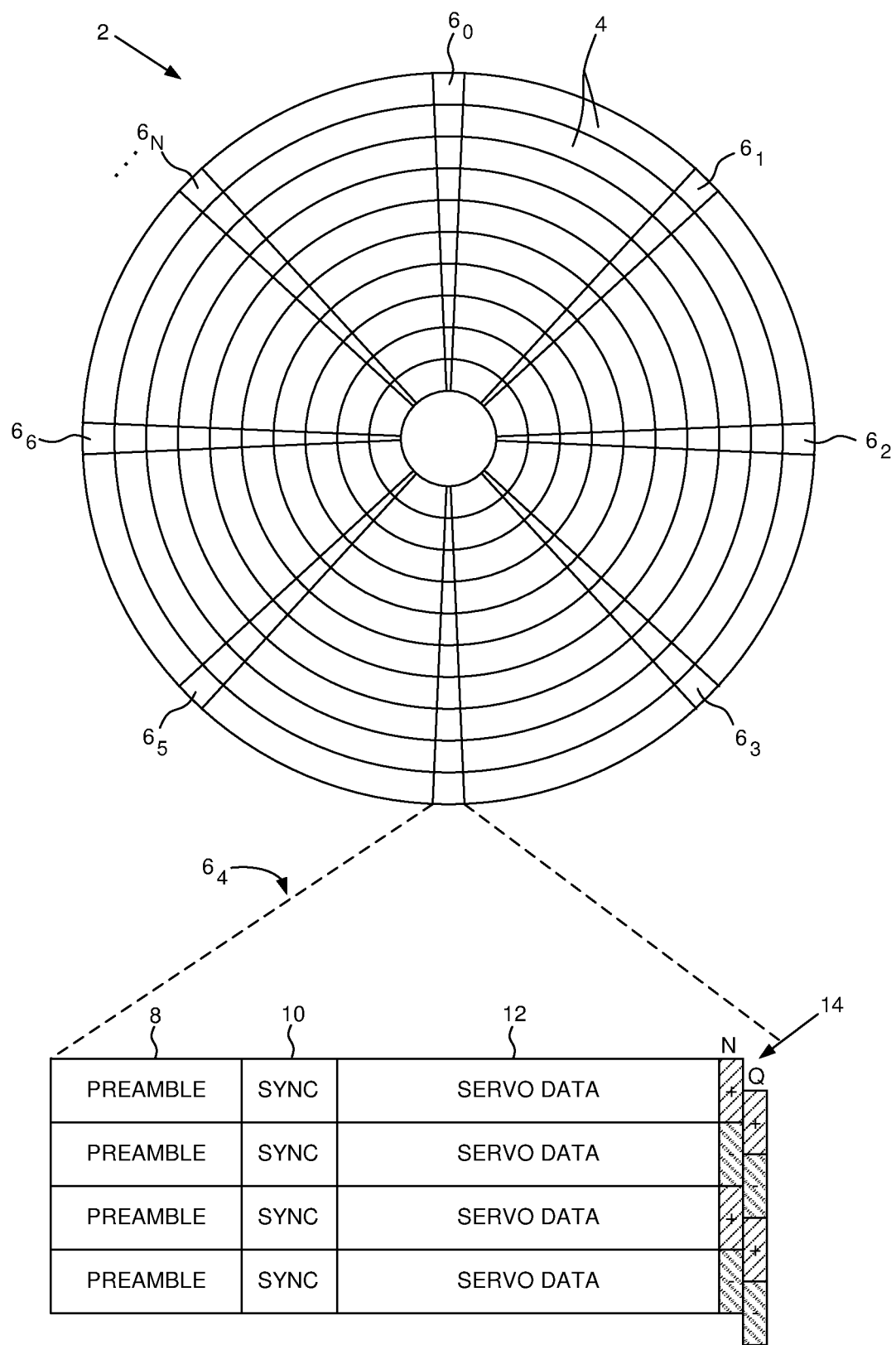
FIG. 1 shows a prior art disk format comprising a plurality of servo tracks defined by servo sectors.

In the embodiment of FIG. 2A, the disk 16 comprises a plurality of servo sectors $38_1$-$38_N$ that define a plurality of servo tracks, wherein the data tracks 18 are defined relative to the servo tracks at the same or different radial density. The control circuitry 24 processes a read signal 40 emanating from the head to demodulate the servo sectors and generate a position error signal (PES) representing an error between the actual position of the head and a target position relative to a target track. A servo control system in the control circuitry 24 filters the PES using a suitable compensation filter to generate a control signal 42 applied to a coarse actuator 44 (e.g., VCM) which rotates an actuator arm 46 about a pivot in order to actuate the head radially over the disk in a direction that reduces the PES. The head may also be servoed using a fine actuator, such as a piezoelectric (PZT) actuator, configured to actuate a suspension relative to the actuator arm 46, and/or configured to actuate the head relative to the suspension. The servo sectors $38_1$-$38_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable read elements $22_1$ and $22_2$ may be employed in the head 20 of FIG. 2A, such as a magnetoresistive (MR) read elements, magnetic tunneling junction (MTJ) read elements, etc. In one embodiment the read elements $22_1$ and $22_2$ may both span at least part of a target data track during a read command, wherein the read signals from both read elements may be demodulated using any suitable two-dimensional magnetic recording (TDMR) signal processing technique. FIG. 2B shows an example of this embodiment wherein when the head 20 is near a middle diameter of the disk 16 the read elements $22_1$ and $22_2$ are at least partially aligned such that both read elements can be used to read a target data track. In another embodiment, the read elements $22_1$ and $22_2$ may be offset from one another by at least one data track such that only one of the read elements may be used to read a target data track during a read command. FIG. 2B shows an example of this embodiment wherein when the head is near the inner or outer diameter of the disk 16, a skew angle of the head 20 results in an offset between the read elements of at least one data track. In one embodiment, a calibration procedure is executed to measure the quality of each read element so as to designate one of the read elements as a primary read element and the other read element as a secondary read element. In this manner when only one of the read elements can be used to read a target data track, the primary read element (having the highest quality) is selected to perform the read command.

In one embodiment, one of the read elements $22_1$ or $22_2$ may exhibit a transient instability that may cause the quality of the corresponding read signal to degrade during a read command. When both read elements are used to read a data track (e.g., TDMR demodulation) an instability of one of the read elements may degrade the quality of the combined read signals to a point where demodulating the read signal from the other (stable) read element alone may provide better performance in terms of decoding accuracy and speed. In an embodiment wherein only one of the read elements may be used to read a target data track as described above, the read element initially designated as the primary read element (highest quality) may exhibit an instability during a read command to a point where reading the data track with the secondary read element may provide better performance. Accordingly in one embodiment, when using the primary read element to read a data sector from a target data track fails, the secondary read element is switched to the primary read element to determine whether the secondary read element provides better performance.

Figure 3A:
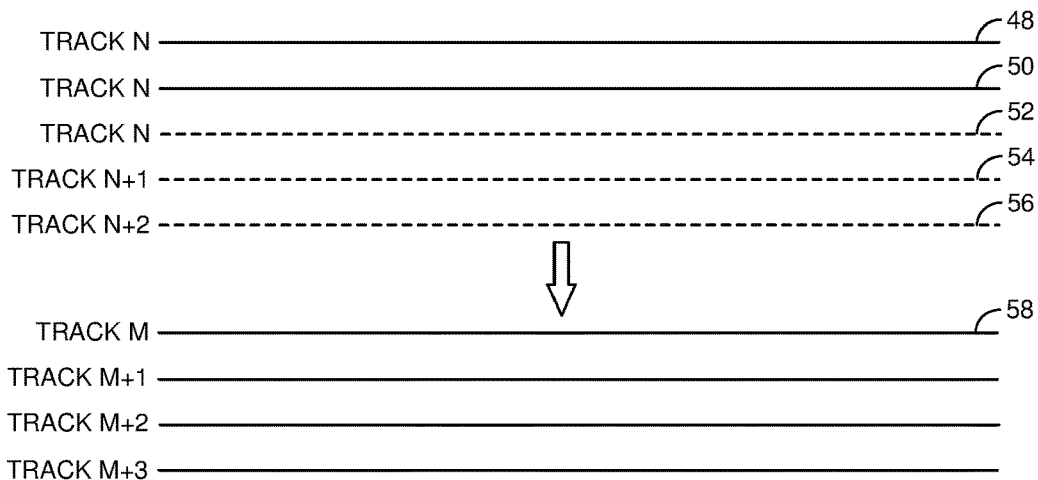
FIG. 3A shows an embodiment wherein the first read element is configured as a primary read element after using the second read element to complete a previous read command.

FIG. 3A shows an example of this embodiment wherein a read command is received from the host to read multiple data tracks including data track N. When initially reading 48 data track N using the primary read element (e.g., the first read element $22_1$ of FIG. 2B), one or more of the data sectors fails to be recovered due to a transient instability of the primary read element. That is, the transient instability causes the read signal to degrade to a point where a data sector becomes unrecoverable (e.g., using an error correction code). When one or more of the data sectors are unrecoverable, in one embodiment the control circuitry 24 executes steps of an error recovery procedure (ERP) in an attempt to recover the failed data sectors. For example, in one embodiment a first step of the ERP may be to execute a retry read 50 of data track N using the primary read element (where one or more parameters may be adjusted during the retry read, such as jogging the target centerline of the data track). In one embodiment when the retry read 50 of data track N using the primary read element fails, the control circuitry configures the secondary read element (e.g., read element $22_2$) as the primary read element and executes another retry read 52 of data track N. If the retry read 52 of data track N is successful, in one embodiment the configuration of the primary read element remains "sticky" while attempting to read subsequent data tracks. That is in the embodiment shown in FIG. 3A, when the retry read 52 of data track N is successful the control circuitry 24 reads 54 data track N+2 and reads 56 data track N+3 without changing the designation for the primary read element.

Figure 3B:
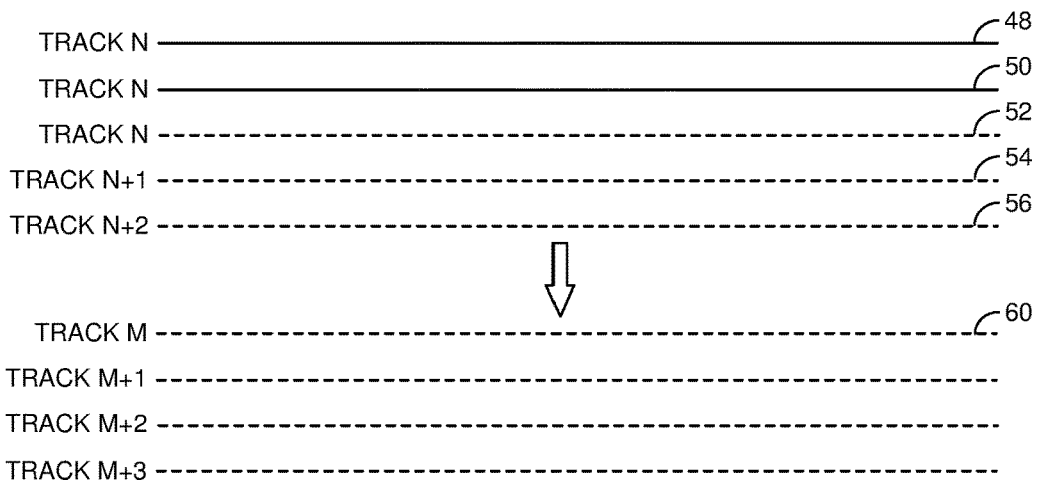
FIG. 3B shows an embodiment wherein when the second read element is configured as the primary read element during a current read command, the primary designation may remain sticky for subsequent read commands.

In the example of FIG. 3A, after executing the current read command the control circuitry 24 receives a subsequent read command to read data tracks including data track M. In one embodiment, the control circuitry 24 presumes that the instability of the read element detected during the previous read command (i.e., when reading data track N) was a transient condition that has likely resolved. Accordingly in one embodiment, prior to executing the next read command the control circuitry 24 resets the designation of the primary read element back to the original designation (e.g., from read element $22_2$ back to read element $22_1$). In this manner if the instability has in fact resolved, using the read element initially designated as the primary read element to read 58 data track M will provide the best read performance over the read element initially designated as the secondary read element. In another embodiment shown in FIG. 3B, when the control circuitry 24 swaps the primary/secondary designation for the read elements during a current read command, the primary/secondary designation remains "sticky" for the next read command. That is when reading 60 data track M of the next read command, in one embodiment the control circuitry 24 uses the "switched" primary read element (e.g., read element $22_2$) instead of resetting to the initial primary read element (e.g., read element $22_1$).

Figure 3C:
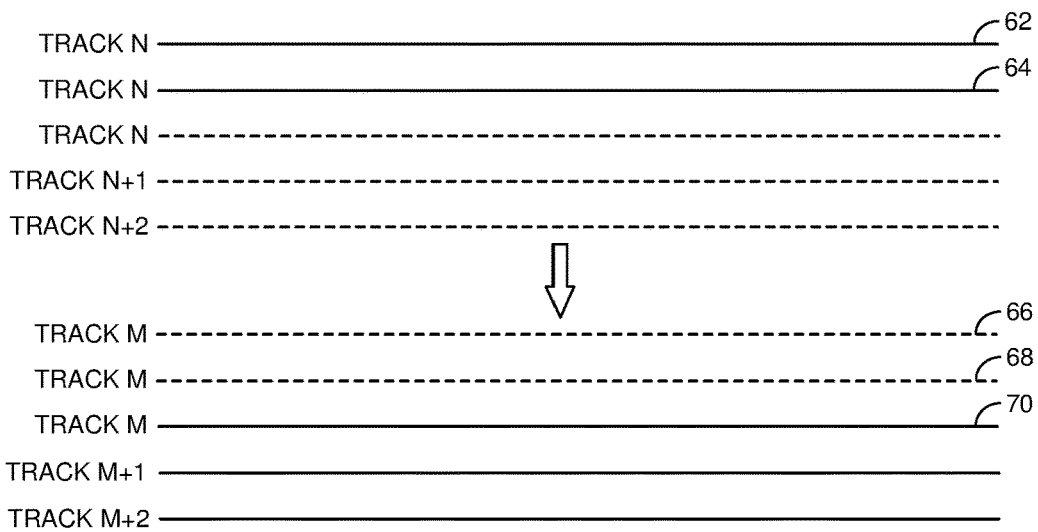
FIG. 3C shows an embodiment wherein when the second read element is the primary read element, the first read element may again become the primary read element if the second read element fails to recover data during a current or subsequent read command.

In one embodiment, the control circuitry 24 may "ping pong" the primary read element between the first and second read elements depending on the performance of the primary read element. FIG. 3C shows an example of this embodiment wherein the control circuitry 24 begins reading 62 data track N using the initial primary read element (e.g., read element $22_1$) and then switches the primary read element to the secondary read element (e.g., read element $22_2$) when a retry read 64 of data track N fails. The control circuitry 24 retains the designation of the primary read element through to the next read command (i.e., the designation remains "sticky"). While executing the next read command using the primary read element, a failure occurs when reading 66 from data track M. When the failure reoccurs during a retry read 68 of data track M using the primary read element, the control circuitry 24 switches the primary read element (e.g., from read element $22_2$) to the secondary read element (e.g., to read element $22_1$). If the primary read element (e.g., read element $22_1$) successfully recovers the data when reading 70 data track M, the designation of the primary read element remains sticky until another read failure is detected (during the current or subsequent read command).

In the embodiments described above, switching the designation of the primary/secondary read elements occurs after a first retry read fails during the ERP. In other embodiments, the switching may occur sooner in the ERP (e.g., as the first step) or later in the ERP (e.g., after multiple retry reads). In one embodiment, the trigger for switching the designation of the primary/secondary read elements may be adapted over time. That is, the sequence of the ERP steps, including when to switch the primary/secondary read elements, may be adapted over time in order to optimize any suitable performance metric, such as a throughput of read commands, tail latency of read commands, etc. In one embodiment, the control circuitry 24 may switch the primary/secondary designation as described above and then switch back when the secondary read element fails to provide better performance. Referring to the example of FIG. 3A, switching the primary read element (to the secondary read element) may provide worse performance when reading 52 data track N, and therefore the control circuitry may switch back to the initial primary read element to continue the ERP sequence (e.g., by adjusting channel parameter(s) and performing further retry reads). In one embodiment, the control circuitry 24 may switch the primary read element multiple times as part of the ERP sequence, and in one embodiment the frequency of the switching may be adapted over time in order to optimize any suitable performance metric.

Referring again to the embodiment of FIG. 2B, the read elements may overlap a target data track such that the read signals from both read elements may be processed using any suitable TDMR signal processing technique. In one embodiment, when the combined read elements fail to recover data from a data track while executing a read command, part of the ERP may include reading the data track with one of the read elements (e.g., a designated primary read element having a better measured performance over a secondary read element). In one embodiment if the initial primary read element fails to recover the data from the data track, the ERP may switch the primary read element to the secondary read element as described above. In this embodiment, when one of the read elements successfully recovers the data from the data track, the control circuitry 24 may retain the single read element configuration through the current read command and even into subsequent read commands until a performance degradation triggers the ERP to execute a retry read using both read elements (i.e., retry reading with both read elements under the presumption the previous failure was due to a transitory instability of a read element).

In the embodiments described above, the head 20 is shown as comprising first and second read elements $22_1$ and $22_2$ that may "ping pong" between a primary/secondary designation during the ERP. In other embodiments, the head 20 may comprise more than two read elements, wherein the control circuitry 24 may attempt various permutations of single element reads during the ERP and/or various permutations of dual element reads during the ERP.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of data tracks, wherein each data track comprises a plurality of data sectors;
a head actuated over the disk, wherein the head comprises a first read element and a second read element; and
control circuitry configured to:
receive a first read command from a host to read a plurality of data sectors from a magnetic media;
configure the first read element into a primary read element and configure the second read element into a secondary read element;
use the primary read element to read a first data sector of the first read command;
when the primary read element fails to recover the first data sector of the first read command, configure the second read element into the primary read element and configure the first read element into the secondary read element; and
use the primary read element to read a second data sector of the first read command.

2. The data storage device as recited in claim 1, wherein when using the primary read element to read the first data sector of the first read command, the secondary read element is offset from the primary read element by at least one data track.

3. The data storage device as recited in claim 1, wherein after configuring the second read element into the primary read element, the control circuitry is further configured to use the primary read element to execute a first retry read of the first data sector of the first read command.

4. The data storage device as recited in claim 3, wherein when the primary read element fails to recover the first data sector of the first read command during the first retry read, the control circuitry is further configured to:
configure the first read element into the primary read element and configure the second read element into the secondary read element; and use the primary read element to execute a second retry read of the first data sector of the first read command.

5. The data storage device as recited in claim 1, wherein when the second read element is configured into the primary read element while executing the first read command, the control circuitry is further configured to:
receive a second read command from a host to read a plurality of data sectors from the disk;
configure the first read element into the primary read element and configure the second read element into the secondary read element; and
use the primary read element to read a first data sector of the second read command.

6. The data storage device as recited in claim 5, wherein the control circuitry is further configured to:
when the primary read element fails to recover the first data sector of the second read command, configure the second read element into the primary read element and configure the first read element into the secondary read element; and
use the primary read element to read a second data sector of the second read command.

7. The data storage device as recited in claim 1, wherein when the second read element is configured into the primary read element while executing the first read command, the control circuitry is further configured to:
receive a second read command from a host to read a plurality of data sectors from the disk; and
use the primary read element to read a first data sector of the second read command.

8. The data storage device as recited in claim 7, wherein the control circuitry is further configured to:
when the primary read element fails to recover the first data sector of the second read command, configure the first read element into the primary read element and configure the second read element into the secondary read element; and
use the primary read element to read a second data sector of the second read command.

9. A data storage device comprising:
a disk comprising a plurality of data tracks, wherein each data track comprises a plurality of data sectors;
a head actuated over the disk, wherein the head comprises a first read element and a second read element; and
control circuitry configured to:
receive a first read command from a host to read a plurality of data sectors from the disk;
use the first read element to read a first data sector of the first read command; and
when the first read element fails to recover the first data sector of the first read command, use the second read element to execute a first retry read of the first data sector of the first read command, and use the second read element to read a second data sector of the first read command, and
when the second read element fails to recover the first data sector of the first read command during the first retry read, use the first read element to execute a second retry read of the first data sector of the first read command.

10. The data storage device as recited in claim 9, wherein when using the first read element to read the first data sector of the first read command, the second read element is offset from the first read element by at least one data track.

11. The data storage device as recited in claim 9, wherein when the second read element recovers the second data sector of the first read command, the control circuitry is further configured to:
receive a second read command from a host to read a plurality of data sectors from the disk; and
use the first read element to read a first data sector of the second read command.

12. The data storage device as recited in claim 11, wherein when the first read element fails to recover the first data sector of the second read command, the control circuitry is further configured to use the second read element to read a second data sector of the second read command.

13. The data storage device as recited in claim 9, wherein when the second read element recovers the second data sector of the first read command, the control circuitry is further configured to:
receive a second read command from a host to read a plurality of data sectors from the disk; and
use the second read element to read a first data sector of the second read command.

14. The data storage device as recited in claim 13, wherein when the second read element fails to recover the first data sector of the second read command, the control circuitry is further configured use the first read element to read a second data sector of the second read command.

15. A data storage device comprising:
a disk comprising a plurality of data tracks, wherein each data track comprises a plurality of data sectors;
a head actuated over the disk, wherein the head comprises a first read element and a second read element; and
a means for receiving a first read command from a host to read a plurality of data sectors from the disk;
a means for using the first read element to read a first data sector of the first read command; and
when the first read element fails to recover the first data sector of the first read command, a means for using the second read element to execute a first retry read of the first data sector of the first read command, and a means for using the second read element to read a second data sector of the first read command; and
when the second read element fails to recover the first data sector of the first read command during the first retry read, further comprising a means for using the first read element to execute a second retry read of the first data sector of the first read command.

16. The data storage device as recited in claim 15, wherein when using the first read element to read the first data sector of the first read command, the second read element is offset from the first read element by at least one data track.

17. A data storage device comprising:
a disk comprising a plurality of data tracks, wherein each data track comprises a plurality of data sectors;
a head actuated over the disk, wherein the head comprises a first read element and a second read element; and
control circuitry configured to:
receive a first read command from a host to read a plurality of data sectors from the disk;
use the first read element to read a first data sector of the first read command; and
when the first read element fails to recover the first data sector of the first read command, use the second read element to read a second data sector of the first read command; and
when the second read element recovers the second data sector of the first read command:

receive a second read command from a host to read a plurality of data sectors from the disk, and
use the first read element to read a first data sector of the second read command.

18. The data storage device as recited in claim 17, wherein when the first read element fails to recover the first data sector of the second read command, the control circuitry is further configured to use the second read element to read a second data sector of the second read command.

19. A data storage device comprising:
   a disk comprising a plurality of data tracks, wherein each data track comprises a plurality of data sectors;
   a head actuated over the disk, wherein the head comprises a first read element and a second read element; and
   control circuitry configured to:
      receive a first read command from a host to read a plurality of data sectors from the disk;
      use the first read element to read a first data sector of the first read command; and
      when the first read element fails to recover the first data sector of the first read command, use the second read element to read a second data sector of the first read command; and
      when the second read element recovers the second data sector of the first read command:
         receive a second read command from a host to read a plurality of data sectors from the disk, and
         use the second read element to read a first data sector of the second read command; and
      when the second read element fails to recover the first data sector of the second read command, use the first read element to read a second data sector of the second read command.

20. The data storage device of claim 1, wherein the second data sector is radially offset and/or circumferentially offset from the first data sector.

* * * * *